(12) United States Patent
Fujimoto et al.

(10) Patent No.: US 8,997,960 B2
(45) Date of Patent: Apr. 7, 2015

(54) OIL PASSAGE STRUCTURE FOR HYDRAULIC CLUTCH OF AN ENGINE

(75) Inventors: Yasushi Fujimoto, Wako (JP); Kinya Mizuno, Wako (JP); Yoshiaki Tsukada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 587 days.

(21) Appl. No.: 13/041,715

(22) Filed: Mar. 7, 2011

(65) Prior Publication Data

US 2011/0233022 A1  Sep. 29, 2011

(30) Foreign Application Priority Data

Mar. 26, 2010 (JP) ................................ 2010-072637

(51) Int. Cl.
| F16D 13/74 | (2006.01) |
| F16D 25/10 | (2006.01) |
| F16D 25/12 | (2006.01) |
| F16D 48/02 | (2006.01) |

(52) U.S. Cl.
CPC ................ F16D 25/10 (2013.01); F16D 25/12 (2013.01); F16D 48/02 (2013.01)

(58) Field of Classification Search
CPC ......................... F16D 13/74; F16D 2048/0224
USPC ............................. 192/48.614, 85.25, 85.61
See application file for complete search history.

(56) References Cited

U.S. PATENT DOCUMENTS

| 4,252,031 | A | * | 2/1981 | Nishimura et al. ............. 74/360 |
| 4,473,144 | A |   | 9/1984 | Allori |
| 4,751,989 | A | * | 6/1988 | Shinokawa et al. ......... 192/13 R |
| 5,630,492 | A | * | 5/1997 | Yoshikawa et al. ........ 192/106 F |
| 8,215,470 | B2 | * | 7/2012 | Ishikawa et al. ........... 192/85.24 |
| 2003/0131684 | A1 |   | 7/2003 | Hori et al. |
| 2009/0084651 | A1 | * | 4/2009 | Fujimoto et al. ........... 192/87.14 |

FOREIGN PATENT DOCUMENTS

| DE | 3508375 A | 11/1985 |
| EP | 2068030 A | 6/2009 |
| JP | 51-99755 A | 9/1976 |
| JP | 54-103958 A | 8/1979 |
| JP | 60084473 A | 5/1985 |
| JP | 60-189665 U | 12/1985 |
| JP | 61-170757 U | 10/1986 |

(Continued)

OTHER PUBLICATIONS

EP International Search Report for EP Application No. 11153631, dated Apr. 7, 2011.

*Primary Examiner* — Gene Crawford
*Assistant Examiner* — Mark Manley
(74) *Attorney, Agent, or Firm* — Squire Patton Boggs (US) LLP (57) ABSTRACT

A cavity 135 having a closed end wall 135a facing an end of a rotational shaft 71 and receiving the end of the rotational shaft 71 therein is defined in an inner surface of a case cover 55 such that supply oil passages 125, 126 are open at inner circumferential surfaces of the cavity 135. At least one radial joint hole 138 is defined in an end portion of the rotational shaft 71 and extends radially of the rotational shaft 71, the radial joint hole 138 having an inner end connected to another oil passage 111 in the rotational shaft 71 than a particular oil passage 112 in the rotational shaft 71. The radial joint hole 138 is connected to a corresponding supply oil passage 125 of the supply oil passages 125, 126, in the cavity 135.

19 Claims, 7 Drawing Sheets

(56) References Cited

FOREIGN PATENT DOCUMENTS

| JP | 62-149668 | U | 9/1987 |
| JP | 1-174657 | U | 12/1989 |
| JP | 8277852 | A | 10/1996 |
| JP | 2008-089064 | | 4/2008 |

\* cited by examiner

OIL PASSAGE STRUCTURE FOR HYDRAULIC CLUTCH OF AN ENGINE

BACKGROUND

1. Field

Embodiments of the present invention relate to an oil passage structure for a hydraulic clutch of an engine.

2. Description of the Related Art

It is known from Japanese Patent Laid-Open No. 2008-89064 that three pipes disposed concentrically and having ends supported on a case cover are inserted in a rotational shaft. The pipes provide, in the rotational shaft independently of each other, oil passages for supplying control hydraulic pressures respectively to a pair of hydraulic clutches and an oil passage for supplying lubricating oil to a canceler chamber of one of the hydraulic clutches.

According to the structure disclosed in Japanese Patent Laid-Open No. 2008-89064, however, since the case cover and the rotational shaft whose one end is disposed at a position spaced from an inner surface of the case cover are connected to each other by the three pipes, an engine which incorporates the structure tends to be large in size along the axis of the rotational shaft.

SUMMARY

Embodiments of the present invention provide an oil passage structure for a hydraulic clutch for an engine. The oil passage structure, according to certain embodiments, results in an engine with decreased size in connection with the supply of oil to the hydraulic clutch which is mounted on a rotational shaft.

One embodiment of the present invention is directed to an oil passage structure for a hydraulic clutch of an engine. In an embodiment, the clutch is mounted on a rotational shaft having an axis parallel to a crankshaft and rotatably supported in a crankcase. The oil passage structure includes a plurality of oil passages defined in the rotational shaft and extending axially thereof for supplying oil to a hydraulic clutch and a plurality of supply oil passages for guiding oil from an oil supply source. The supply oil passages are defined in a case cover covering the hydraulic clutch and coupled to the crankcase and being connected individually to the oil passages in the rotational shaft. A cavity having a closed end wall facing an end of the rotational shaft and receiving the end of the rotational shaft therein is defined in an inner surface of the case cover such that the supply oil passages are open at inner circumferential surfaces of the cavity. At least one radial joint hole is defined in an end portion of the rotational shaft (71) and extends radially of the rotational shaft. The radial joint hole includes an inner end connected to the other one of the oil passages in the rotational shaft, and the radial joint hole connected to a corresponding one of the supply oil passages in the cavity (135).

According to another embodiment of the invention, a cylindrical tubular member is interposed between an outer circumferential surface of the end portion of the rotational shaft and an inner circumferential surface of the cavity. The cylindrical tubular member including oil passage forming recesses defined in outer circumferential surfaces thereof independently of each other and connected individually to the supply oil passages. An oil chamber that is connected to the particular oil passage is defined between the closed end wall of the cavity, the end of the rotational shaft, and an end of the tubular member. The tubular member has an axial oil hole defined therein which extends axially thereof and allowing one of the oil passage forming recesses to be connected to the oil chamber, and a radial oil hole defined therein which extends radially thereof and allowing the other oil passage forming recess to be connected to the radial joint hole.

According to another embodiment of the invention, first and second hydraulic clutches which are juxtaposed along the axis of the rotational shaft are mounted on the rotational shaft. The oil passages which are paired in the rotational shaft are connected individually to respective control hydraulic pressure chambers of the first and second hydraulic clutches.

According to another embodiment of the invention, the oil passages in the rotational shaft are disposed at intervals circumferentially around a central axis of the rotational shaft.

In another embodiment of the invention, the tubular member is disposed inwardly of an inner circumferential surface of a clutch piston of the hydraulic clutch on a projection onto a plane perpendicular to the axis of the rotational shaft.

According to another embodiment of the invention, the axial oil hole is shaped as an oblong hole which is long in a circumferential direction of the tubular member.

In another embodiment of the invention, a pair of annular seal members are mounted on an outer circumferential surface of the tubular member and held in elastic contact with an inner circumferential surface of the cavity for sealing the opposite sides of a region where the oil passage forming recesses and the supply oil passages are connected to each other.

According to an embodiment, a plug which closes an axial end of the other oil passage is press-fitted in the end portion of the rotational shaft.

A first shaft in one embodiment corresponds to a rotational shaft. First and second control oil passages in an embodiment correspond to oil passages in the rotational shaft, and an oil pump in one embodiment corresponds to an oil supply source.

DETAILED DESCRIPTION

Figure 1:
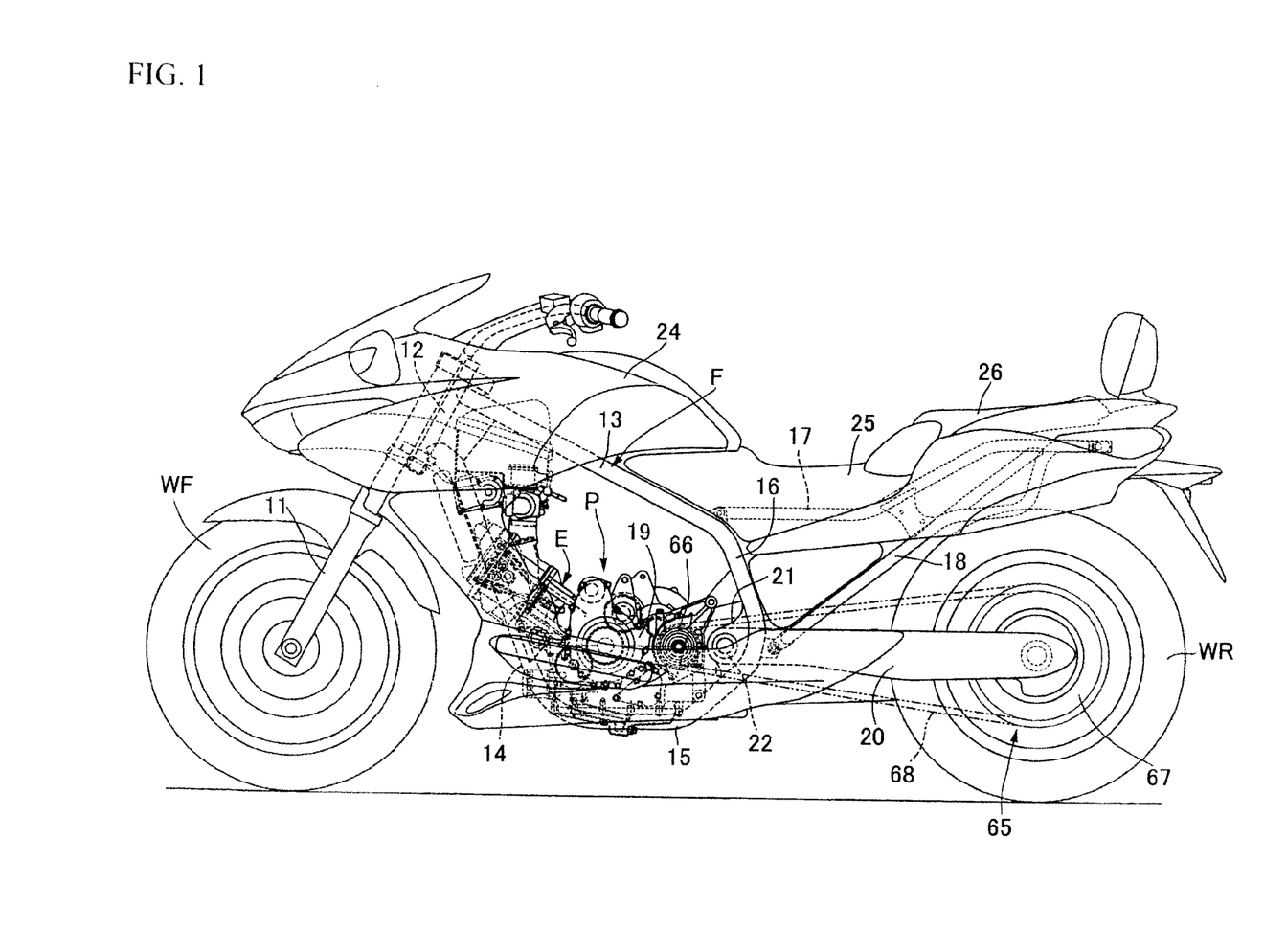
FIG. 1 is a side elevational view of a motorcycle, according to one embodiment.

An embodiment of the present invention will be described below with reference to the accompanying drawings. As shown in the example of FIG. 1, a vehicle, such as a motorcycle, has a vehicle body frame F including a head pipe 12 on which a front fork 11 is steerably supported. A front wheel WF may be supported on the front fork 11 by a shaft. A pair of left and right main frames 13 extend rearwardly and downwardly from the head pipe 12, and a pair of left and right down frames 14 extend rearwardly and downwardly from the head pipe 12 more steeply than the main frames 13. A pair of left and right lower frames 15 extend rearwardly from the lower ends of the down frames 14, and a pair of left and right central frames 16 extend downwardly from the rear ends of the main frames 13 and joined to the rear end of the lower frames 15. A pair of left and right seat rails 17 may extend rearwardly and upwardly from the rear ends of the main frames 13, and a pair of left and right rear frames 18 interconnect the lower portions of the central frames 16 and the rear portions of the seat rails 17. In one embodiment, the main frames 13, the down frames 14, the lower frames 15, and the central frames 16 may be formed from bent metal pipes integrally joined together.

Figure 3:
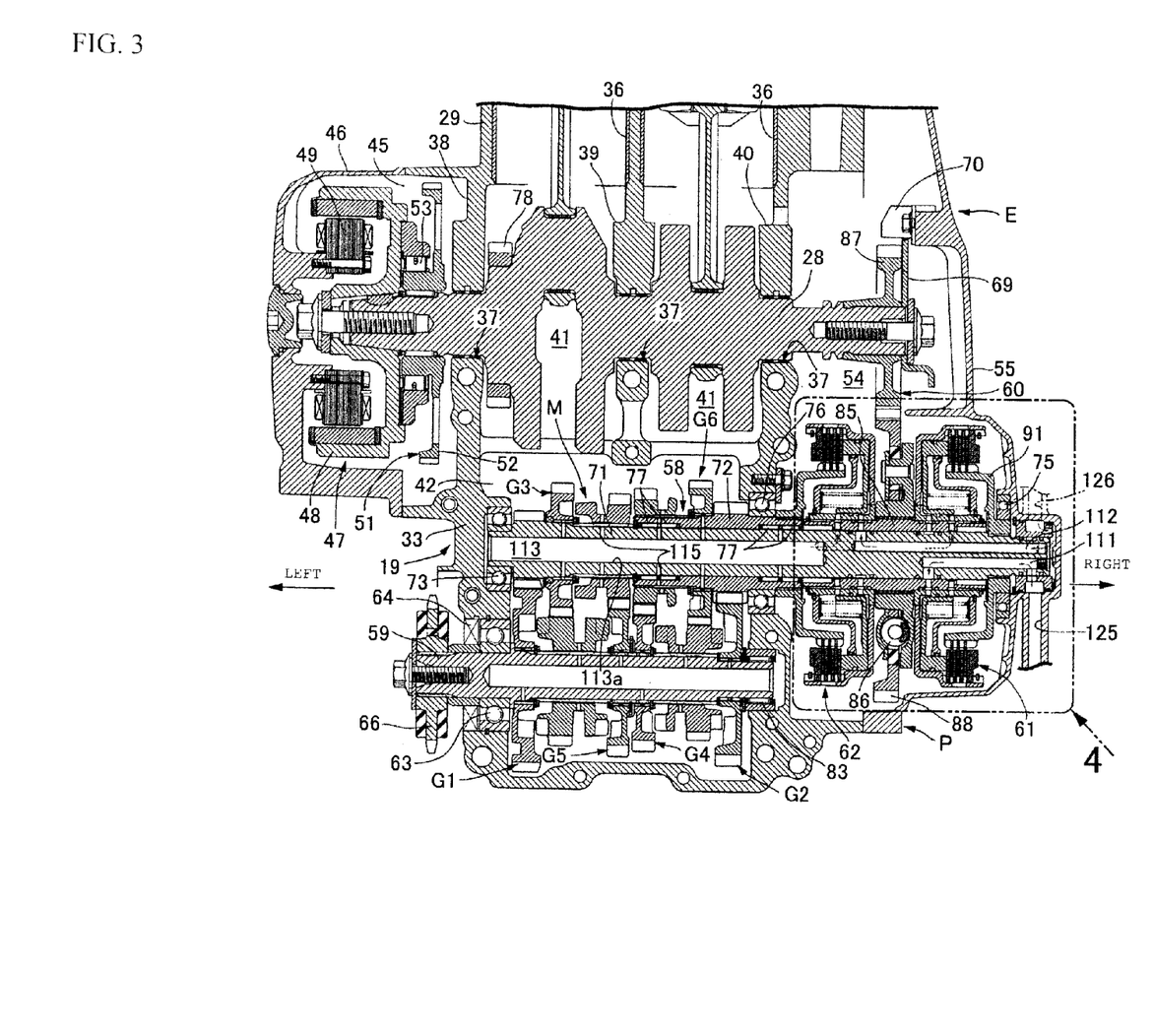
FIG. 3 is a cross-sectional view taken along line 3-3 of FIG. 2.

According to certain embodiments, a power unit P can include a multicylinder, for example two-cylinder, engine E and a gear transmission M (see FIG. 3). Power unit P may be partly housed in a crankcase 19 of the engine E and disposed in a region that is surrounded by the main frames 13, the down frames 14, the lower frames 15, and the central frames 16 such that the power unit P is supported by the vehicle frame F. A rear wheel WR which is driven by power generated by the power unit P is supported by a shaft on the rear end of a swing arm 20. The swing arm 20 has a front end vertically swingably supported by a support shaft 22 on pivot plates 21 that is disposed on lower portions of the central frames 16. A fuel tank 24 is mounted on the main frames 13 above the engine E. The front seat rails 17 support thereon a front riding seat 25 disposed rearwardly of the fuel tank 24 and a rear riding seat 26 disposed rearwardly of the front riding seat 25.

Figure 2:
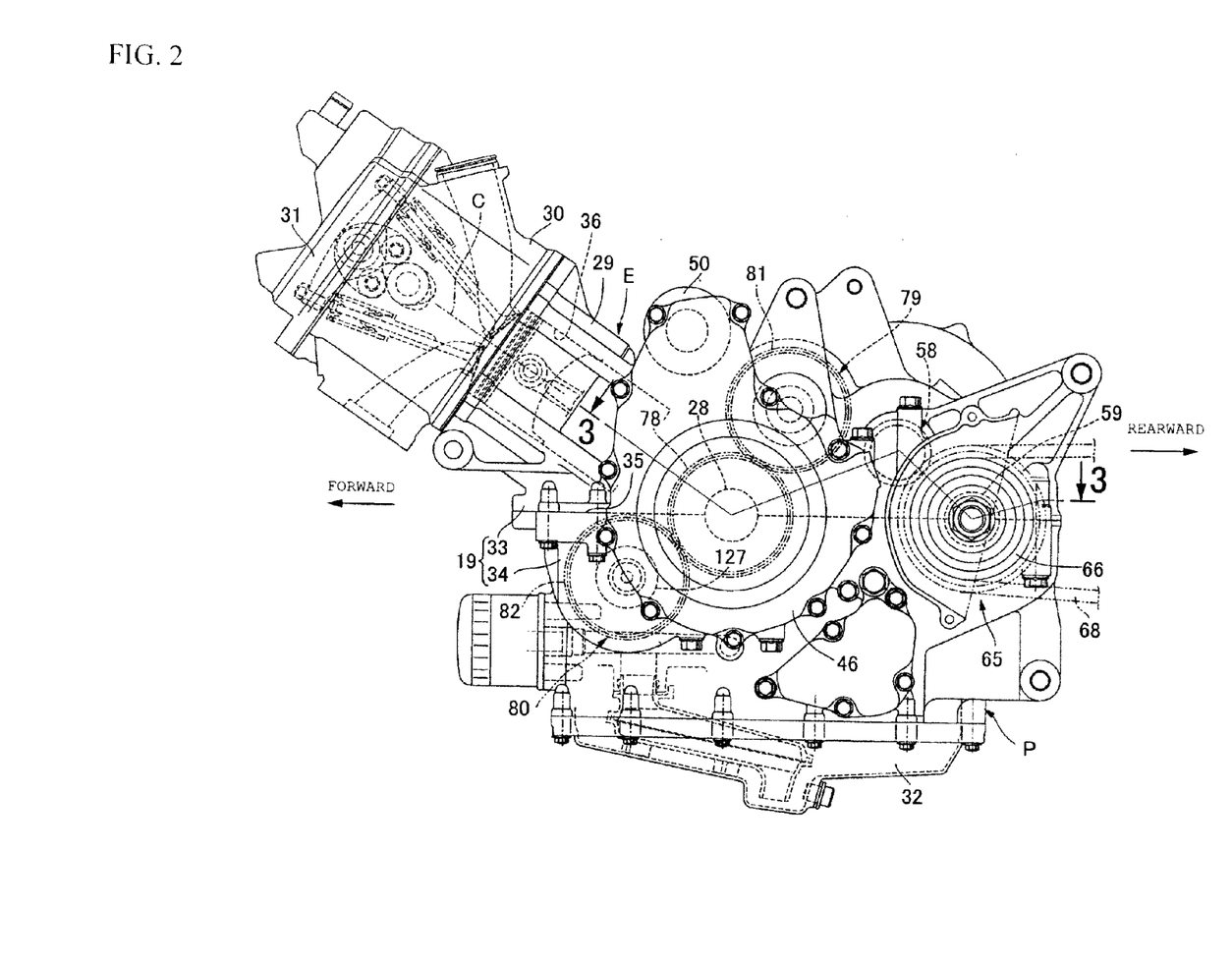
FIG. 2 is a side elevational view of a power unit as viewed in the same direction as FIG. 1, according to an embodiment.

As shown in the example of FIG. 2, the engine E includes a crankcase 19 in which a crankshaft 28 having an axis extending transversely of the motorcycle is rotatably supported. The engine E can also include a cylinder block 29 having a forwardly inclined cylinder axis C, coupled to a front upper end of the crankcase 19, a cylinder head 30 coupled to an upper end of the cylinder block 29, and a head cover 31 coupled to an upper end of the cylinder head 30. An oil pan 32 can be coupled to a lower portion of the crankcase 19.

As also shown in the example of FIG. 3, the crankcase 19 includes an upper case body 33 and a lower case body 34 which are separably coupled to each other across a parting plane 35. The cylinder block 29 is integrally formed with the upper case body 33.

In an embodiment, the cylinder block 29 has a plurality, for example, two, cylinder bores 36 juxtaposed transversely of the motorcycle. The crankshaft 28 which extends along the direction in which the cylinder bores 36 are arranged, i.e., transversely of the motorcycle, is rotatably supported in the crankcase 19. The crankcase 19 has first through third support walls 38, 39, 40 having respective bearing holes 37 through which the crankshaft 28 extends and in which the crankshaft 28 is supported. The support walls 38, 39, 40 are arranged successively from one end (left end in FIG. 3) of the crankshaft 28 toward the other end (right end in FIG. 3) of the crankshaft 28. Crank chambers 41 which correspond individually to the cylinder bores 36 are defined between adjacent ones of the support walls, i.e., between the first and second support walls 38, 39 and between the second and third support walls 39, 40, along the axis of the crankshaft 28 in the crankcase 19. A transmission chamber 42 which is connected commonly to the crank chambers 41 is defined in a rear portion of the crankcase 19.

According to an embodiment, a left case cover 46 which defines a generator chamber 45 between itself and the crankcase 19 is coupled to a left side surface of the crankcase 19. The generator chamber 45 houses therein a generator 47 including a rotor 48 fixed to the end of the crankshaft 28 which projects into the generator chamber 45 and a stator 49 surrounded by the rotor 48 and fixed to the left case cover 46.

As shown in the example of FIG. 2, a starter motor 50 may be fixedly disposed above the crankcase 19 and laterally covered by an upper end portion of the left case cover 46. A speed reducer gear train 51 for transmitting power from the stator motor 50 may include a driven gear 52 that is connected to the rotor 48 by a one-way clutch 53.

According to one embodiment, a drive gear 78 can be fixed to the crankshaft 28 closely to the first support wall 38 of the crankcase 19 within the crankcase 19. As shown in FIG. 2, first and second balancers 79, 80, i.e., primary balancers, are rotatably supported in the crankcase 19. The first balancer 79 may be disposed rearwardly and obliquely upwardly of the crankshaft 28, and the second balancer 80 is disposed forwardly and obliquely downwardly of the crankshaft 28. The first and second balancers 79, 80 have driven gears 81, 82, respectively, that are held in driven mesh with the drive gear 78.

A right case cover 55, which defines a clutch chamber 54 between itself and the crankcase 19, may be coupled to a right side surface of the crankcase 19. The transmission chamber 42 houses therein a gear transmission M including a main shaft 58 and a countershaft 59 which have respective axes parallel to the crankshaft 28 and rotatably supported in the crankcase 19 and a plurality of gear trains for gear positions, e.g., first through sixth gear trains G1 through G6, which can selectively be established, between the main shaft 58 and the countershaft 59. The clutch chamber 54 may house therein a primary speed reducer 60 for transmitting power from the crankshaft 28 and first and second hydraulic clutches 61, 62 interposed between the primary speed reducer 60 and the main shaft 58.

In one embodiment, the countershaft 59 has an end rotatably supported on a right side wall of the crankcase 19 by a roller bearing 83 and the other end projecting from a rear left side surface of the crankcase 19 with a ball bearing 63 and an annular seal member 64 being interposed between itself an the crankcase 19.

As shown in the example of FIG. 1, rotational power output from the other end of the countershaft 59 is transmitted to the rear wheel WR by power transmitting means 65. The power transmitting means 65 can include a drive sprocket 66 fixed to the end of the countershaft 59, a driven sprocket 67 mounted coaxially on the rear wheel WR, and an endless chain 68 trained around the drive sprocket 66 and the driven sprocket 67.

According to an embodiment, a pulser 69 is fixed to the end of the crankshaft 28 in the clutch chamber 54. A rotational speed sensor 70 may be disposed in the clutch chamber 54 in confronting relation to an outer circumferential portion of the pulser 69 and fixed to the right case cover 55.

The main shaft 58, in one embodiment, includes a first shaft 71 and a second shaft 72 in which the first shaft 71 is coaxially and relatively rotatably inserted. The first gear train G1, the third gear train G3, and the fifth gear train G5 are provided between the first shaft 71 and the countershaft 59. The second gear train G2, the fourth gear train G4, and the sixth gear train G6 are provided between the second shaft 72 and the counter shaft 59.

According to one embodiment, the first shaft 71 is smaller in diameter than the second shaft 72. The first shaft 71, which rotatably extends through the crankcase 19, has an end portion rotatably supported in the right case cover 55 by a first clutch inner member 91 and a ball bearing 75. The other end of the first shaft 71 is rotatably supported in the upper case body 33 of the crankcase 19 by a ball bearing 73. The second shaft 72, which may be greater in diameter than the first shaft 71, has an axially intermediate portion rotatably supported in the crankcase 19 by a ball bearing 76. The first shaft 71 has an intermediate portion coaxially and relatively rotatably extending through the second shaft 72. A plurality of needle bearings 77 are interposed between the first shaft 71 and the second shaft 72.

Figure 4:
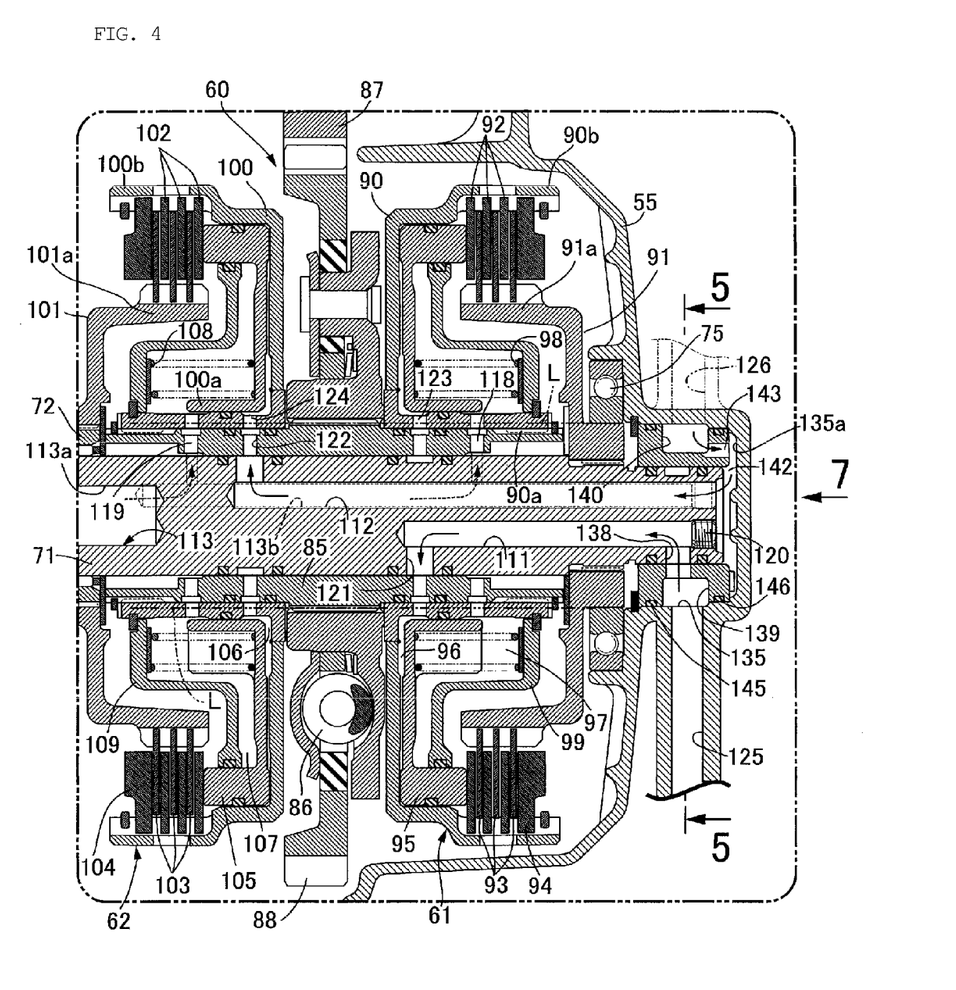
FIG. 4 is an enlarged view of a portion of FIG. 3, and a cross-sectional view taken along line 4-4 of FIG. 5.

As also shown in the example of FIG. 4, a transmission tubular shaft 85 axially adjacent to the second shaft 72 is axially immovably and relatively rotatably mounted on an intermediate portion of the first shaft 71 closely to an end thereof. In one embodiment, the first hydraulic clutch 61 is mounted on the first shaft 71 for selectively transmitting and cutting off power between the transmission tubular shaft 85 and the first shaft 71. The second hydraulic clutch 62, according to an embodiment, is mounted on the first shaft 71 for selectively transmitting and cutting off power between the transmission tubular shaft 85 and the second shaft 72.

Power from the crankshaft 28 is transmitted to the transmission tubular shaft 85 through the primary speed reducer 60 and a damper spring 86. The primary speed reducer 60 can include a drive gear 87 rotatable in unison with the crankshaft 28 and a driven gear 88 disposed coaxially with the first and second shafts 71, 72 and held in mesh with the drive gear 87. The driven gear 88 can be connected to the transmission tubular shaft 85 by the damper spring 86.

According to an embodiment, the first hydraulic clutch 61 is disposed more closely to one axial end of the first shaft 71 than the primary speed reducer 60. The first hydraulic clutch 61 includes a first clutch outer member 90 which can be, for example, in the form of a concentric double-walled bottomed hollow cylinder having a first tubular boss 90a coaxially surrounding the transmission tubular shaft 85 and a first outer tubular member 90b coaxially surrounding the first tubular boss 90a. The first clutch outer member 90 may be relatively nonrotatably coupled to the transmission tubular shaft 85. A first clutch inner member 91 having a first inner tubular member 91a is coaxially surrounded by the first outer tubular member 90b. The first clutch inner member 91 being relatively nonrotatably coupled to the first shaft 71, with the ball bearing 75 being interposed between the first clutch inner member 91 and the right case cover 55. A plurality of first drive friction plates 92 are relatively nonrotatably engaged by the first outer tubular member 90b of the first clutch outer member 90. A plurality of first driven friction plates 93 are relatively nonrotatably engaged by the first inner tubular member 91a of the first clutch inner member 91 and alternating with the first drive friction plates 92. A first pressure bearing plate 94 is fixedly supported by the first clutch outer member 90 in confronting relation to the first drive friction plates 92 and the first driven friction plates 93 alternating with each other. A first clutch piston 95 sandwiches the first drive friction plates 92 and the first driven friction plates 93 between itself and the first pressure bearing plate 94. The first clutch piston 95 and the first clutch outer member 90 define a first control hydraulic pressure chamber 96 therebetween, and a first spring 98 for biasing the first clutch piston 95 in a direction to reduce the volume of the first control hydraulic pressure chamber 96.

In one embodiment, the first clutch piston 95 has an inner circumferential surface held in fluid-tight sliding contact with the outer circumferential surface of the first boss 90a of the first clutch outer member 90 and an outer circumferential surface held in fluid-tight sliding contact with the first outer tubular member 90b of the first clutch outer member 90. In response to a hydraulic pressure buildup in the first control hydraulic chamber 96, the first clutch piston 95 operates to grip the first drive friction plates 92 and the first driven friction plates 93 between itself and the first pressure bearing plate 94, bringing the first hydraulic clutch 61 into an engaged state wherein the first hydraulic clutch 61 transmits rotational power, which has been transmitted from the crankshaft 28 through the primary speed reducer 60, the damper spring 86, and the transmission tubular shaft 85, to the first clutch outer member 90, to the first shaft 71.

A first canceler chamber 97 may be defined between the first clutch piston 95 and a first wall member 99 opposite to the first control hydraulic chamber 96. The first wall member 99 has an inner circumferential portion supported on the first boss 90a of the first clutch outer member 90 and an outer circumferential portion with which the first clutch piston 95 is held in fluid-tight sliding contact. The first spring 98 is housed in the first canceler chamber 97 and interposed between the first clutch piston 95 and the first wall member 99. Lubricating oil can be introduced into the first canceler chamber 97. Even when forces are generated to press the first clutch piston 95 under centrifugal forces upon rotation which act on oil in the first control hydraulic chamber 96 that is depressurized, since centrifugal forces also act on oil in the first canceler chamber 97, the first clutch piston 95 is prevented from being undesirably moved to grip the first drive friction plates 92 and the first driven friction plates 93 between itself and the first pressure bearing plate 94.

According to an embodiment, the second hydraulic clutch 62 is disposed more closely to the other end of the first shaft 71 than the first hydraulic clutch 61, with the primary speed reducer 60 being positioned between the first hydraulic clutch 61 and the second hydraulic clutch 62. The second hydraulic clutch 62 may include a second clutch outer member 100 that may be in the form of a concentric double-walled bottomed hollow cylinder having a second tubular boss 100a coaxially surrounding the transmission tubular shaft 85 and a second outer tubular member 100b coaxially surrounding the second tubular boss 100a. The second clutch outer member 100 may be relatively nonrotatably coupled to the transmission tubular shaft 85. A second clutch inner member 101 having a second inner tubular member 101a is coaxially surrounded by the second outer tubular member 100b. The second clutch inner member 101 may be relatively nonrotatably coupled to the second shaft 72. A plurality of second drive friction plates 102 are relatively nonrotatably engaged by the second outer tubular member 100b of the second clutch outer member 100. A plurality of second driven friction plates 103 are relatively nonrotatably engaged by the second inner tubular member 101a of the second clutch inner member 101 and alternating with the second drive friction plates 102. A second pressure bearing plate 104 is fixedly supported by the second clutch outer member 100 in confronting relation to the second drive friction plates 102 and the second driven friction plates 103 alternating with each other. A second clutch piston 105 sandwiching the second drive friction plates 102 and the second driven friction plates 103 between itself and the second pressure bearing plate 104. The second clutch piston 105 and the second clutch outer member 100 defining a second control hydraulic pressure chamber 106 therebetween, and a second spring 108 for normally biasing the second clutch inner member 101 in a direction to reduce the volume of the second control hydraulic pressure chamber 106.

According to one embodiment, the second clutch piston 105 has an inner circumferential surface held in fluid-tight sliding contact with the outer circumferential surface of the second boss 100a of the second clutch outer member 100 and an outer circumferential surface held in fluid-tight sliding contact with the second outer tubular member 100b of the second clutch outer member 100. In response to a hydraulic pressure buildup in the second control hydraulic chamber 106, the second clutch piston 105 operates to grip the second drive friction plates 102 and the second driven friction plates 103 between itself and the second pressure bearing plate 104, bringing the second hydraulic clutch 62 into an engaged state wherein the second hydraulic clutch 62 transmits rotational power, which has been transmitted from the crankshaft 28 through the primary speed reducer 60, the damper spring 86, and the transmission tubular shaft 85 to the second clutch outer member 100, to the second shaft 72.

A second canceler chamber 107 can be defined between the second clutch piston 105 and a second wall member 109 opposite to the second control hydraulic chamber 106. In one embodiment, the second wall member 109 has an inner circumferential portion supported on the second boss 100a of the second clutch outer member 100 and an outer circumferential portion with which the second clutch piston 105 is held in fluid-tight sliding contact. The second spring 108 is housed in the second canceler chamber 107 and interposed between the second clutch piston 105 and the second wall member 109. Lubricating oil can be introduced into the second canceler chamber 107. Even when forces are generated to press the second clutch piston 105 under centrifugal forces upon rotation which act on oil in the second control hydraulic chamber 106 that is depressurized, since centrifugal forces also act on oil in the second canceler chamber 107, the second clutch piston 105 is prevented from being undesirably moved to grip the second drive friction plates 102 and the second driven friction plates 103 between itself and the second pressure bearing plate 104.

When the first hydraulic clutch 61 is in a power transmitting state and is transmitting power from the crankshaft 28 to the first shaft 71, it is possible to transmit the power from the first shaft 71 to the countershaft 59 through a selectively established one of the first, third, and fifth gear trains G1, G3, G5. When the second hydraulic clutch 62 is in a power transmitting state and is transmitting power from the crankshaft 28 to the second shaft 72, it is possible to transmit the power from the second shaft 72 to the countershaft 59 through a selectively established one of the second, fourth, and sixth gear trains G2, G4, G6.

Figure 5:
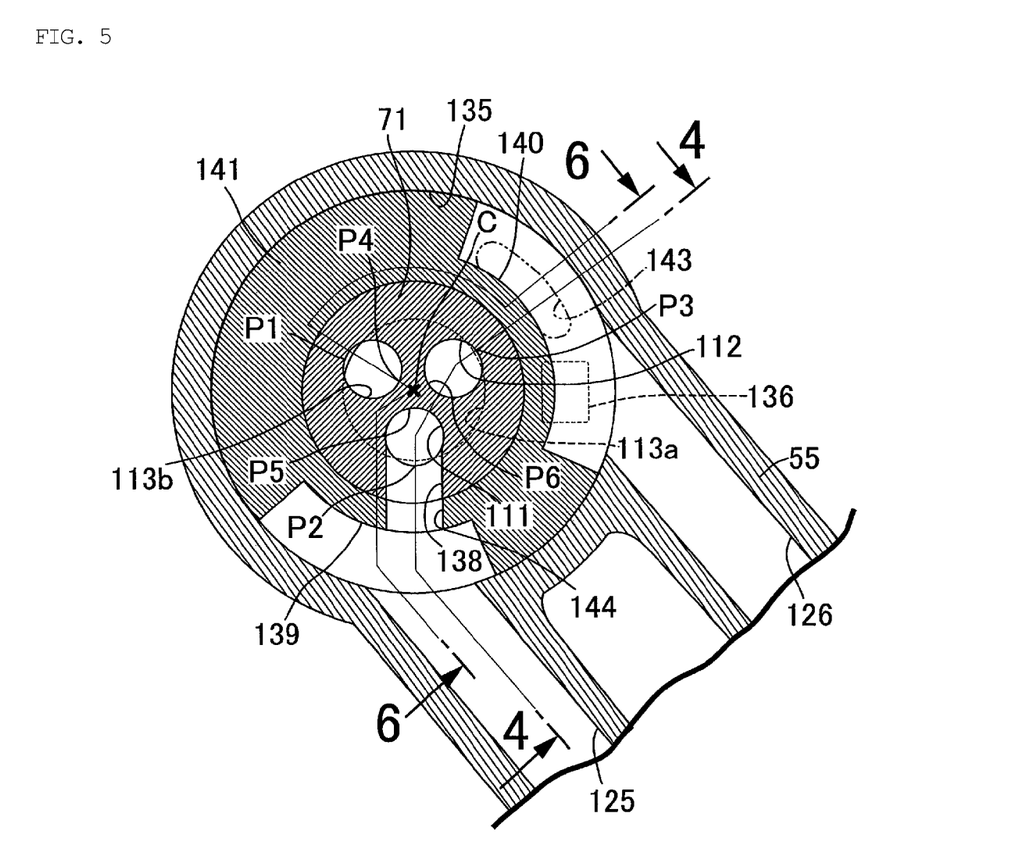
FIG. 5 is a cross-sectional view taken along line 5-5 of FIG. 4.
Figure 6:
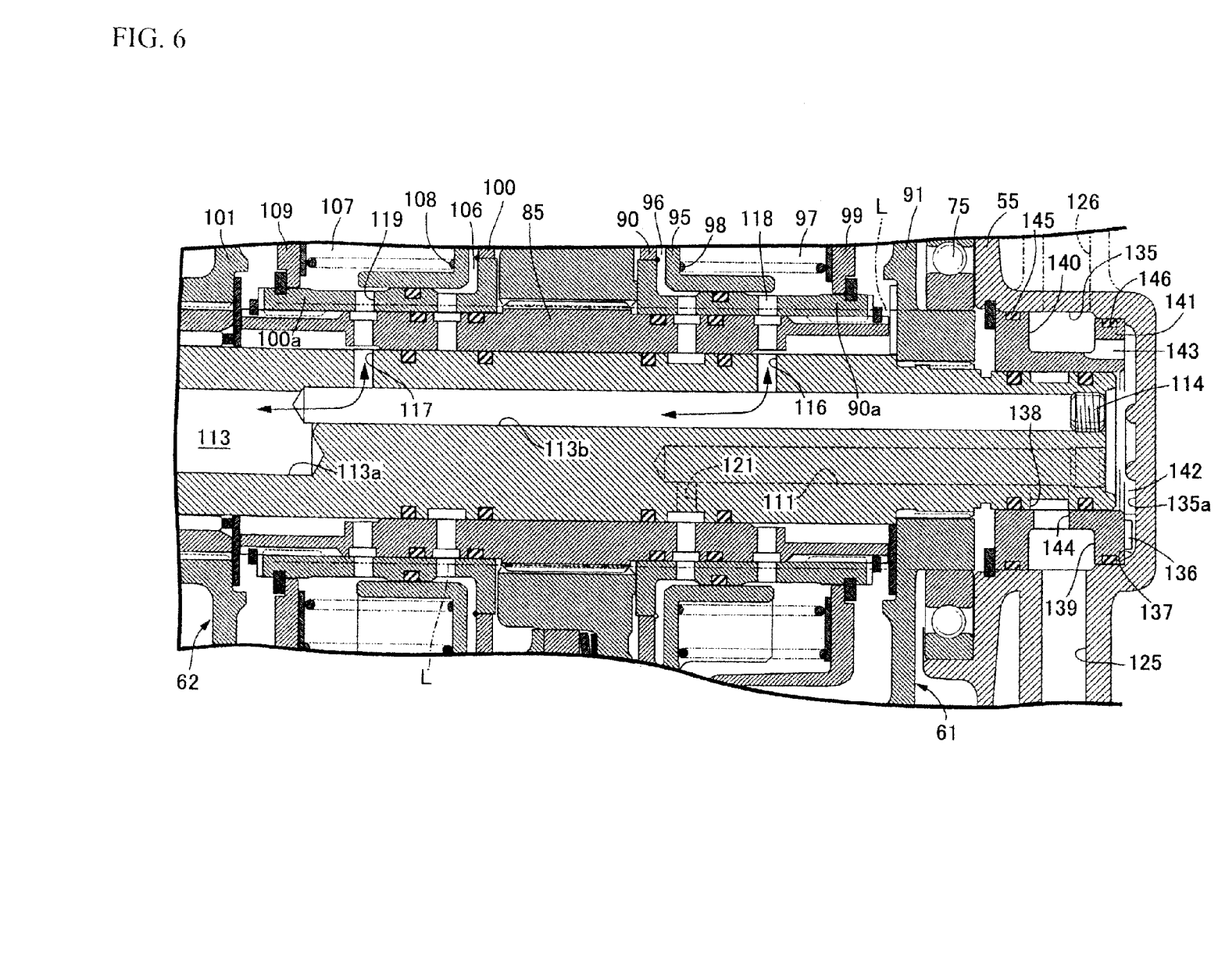
FIG. 6 is a cross-sectional view taken along line 6-6 of FIG. 5.

As also shown in the examples of FIGS. 5 and 6, the first shaft 71 may have a first control oil passage 111 defined therein which is connected to the first control hydraulic pressure chamber 96 of the first hydraulic clutch 61, a second control oil passage 112 defined therein which is connected to the second control hydraulic pressure chamber 106 of the second hydraulic clutch 62, and a lubricating oil passage 113 defined therein for supplying lubricating oil to lubricated parts around the first shaft 71. The lubricating oil passage 113 may be connected to the first and second canceler chambers 97, 107 of the respective first and second hydraulic clutches 61, 62.

The lubricating oil passage 113 can be supplied with lubricating oil from the other end of the first shaft 71. The lubricating oil passage 113, in one embodiment, includes an upstream oil passage 113a defined coaxially in the first shaft 71 for supplying lubricating oil to lubricated parts around the first shaft 71, and a downstream oil passage 113b connected to the upstream oil passage 113a for supplying lubricating oil from the upstream oil passage 113a to the first and second canceler chambers 97, 107. In one embodiment, the downstream oil passage 113b is smaller in diameter than the upstream oil passage 113a and having at least a portion extending parallel to the axis of the first shaft 71. According to an embodiment, the downstream oil passage 113b, which has the same diameter as the first and second control oil passages 111, 112, is defined in the first shaft 71 parallel to the axis of the first shaft 71 and connected to the upstream oil passage 113a.

According to one embodiment, the upstream oil passage 113a is drilled axially into the other end of the first shaft 71 such that its outer end is opens at the other end of the first shaft 71. The upstream oil passage 113a has an inner end disposed at a position which is aligned, as viewed in side elevation, with the second hydraulic clutch 62, among the first and second hydraulic clutches 61, 62 that are juxtaposed in a direction along the axis of the first shaft 71. The downstream oil passage 113b may be drilled axially into the one end portion of the first shaft 71 such that it is connected to the inner end of the upstream oil passage 113a. The downstream oil passage 113b may have its outer end closed by a plug 114.

In one embodiment, the first shaft 71 has a plurality of oil holes 115 defined therein at axially spaced locations for supplying lubricating oil to lubricated parts around the first shaft 71, e.g., a plurality of locations in the gear transmission M and parts between the first and second shafts 71, 72, in the present embodiment, the oil holes 115 having inner ends connected to the upstream oil passage 113a of the lubricating oil passage 113. The first shaft 71 also may have a first canceler chamber oil hole 116 defined therein for introducing lubricating oil into the first canceler chamber 97 of the first hydraulic clutch 61 and a second canceler chamber oil hole 117 for introducing lubricating oil into the second canceler chamber 107 of the second hydraulic clutch 62. The first and second canceler chamber oil holes 116, 117 may have inner ends connected to the downstream oil passage 113b of the lubricating oil passage 113. In one embodiment, the first canceler chamber oil hole 116 is held in fluid communication with the first canceler chamber 97 through a joint hole 118 that is defined in the transmission tubular shaft 85 and the first boss 90a of the first clutch outer member 90. The second chamber oil hole 117 is held in fluid communication with the second canceler chamber 107 through a joint hole 119 that is defined in the transmission tubular shaft 85 and the second boss 100a of the second clutch outer member 100.

The first and second control oil passages 111, 112 are defined in the first shaft 71 such that at least a portion of the first and second control oil passages 111, 112 is disposed in a range wherein the downstream oil passage 113b is provided in a direction along the axis of the first shaft 71. The first control oil passage 111 is drilled axially into the one end portion of the first shaft 71 and has an outer end closed by a plug 120 that is press-fitted into the first shaft 71. The second control oil passage 112 is drilled axially into the one end portion of the first shaft 71 and has an open outer end.

As shown in the example of FIG. 5, the first control oil passage 111, the second control oil passage 112, and the downstream oil passage 113b of the lubricating oil passage 113 are defined in the first shaft 71 such that they are disposed at a position wherein they are partly superposed on the upstream oil passage 113a on a projection onto a plane perpendicular to the axis of the first shaft 71. The first control oil passage 111, the second control oil passage 112, and the downstream oil passage 113b of the lubricating oil passage 113 may be disposed at equal intervals in the circumferential direction of the first shaft 71.

In an embodiment, the downstream oil passage 113b, the first control oil passage 111, and the second control oil passage 112 have respective outer ends P1, P2, P3 along radial directions of the first shaft 71 which are disposed outwardly of the inner circumferential surface of the upstream oil passage 113a. The downstream oil passage 113b, the first control oil passage 111, and the second control oil passage 112 have respective inner ends P4, P5, P6 along radial directions of the first shaft 71 which are disposed outwardly of the central axis C of the upstream oil passage 113a.

The first shaft 71 may have a first control hydraulic pressure chamber oil hole 121 defined therein for guiding control oil into the first control hydraulic pressure chamber 96 of the first hydraulic clutch 61 and having an inner end connected to the first control oil passage 111, and a second control hydraulic pressure chamber oil hole 122 defined therein for guiding control oil into the second control hydraulic pressure chamber 106 of the second hydraulic clutch 62 and having an inner end connected to the second control oil passage 112. In an embodiment, the first control hydraulic pressure chamber oil hole 121 is held in fluid communication with the first control hydraulic pressure chamber 96 through a joint hole 123 that is defined in the transmission tubular shaft 85 and the first boss 90a of the first clutch outer member 90. The second control hydraulic pressure chamber oil hole 122 is held in fluid communication with the second control hydraulic pressure chamber 106 through a joint hole 124 that is defined in the transmission tubular shaft 85 and the second boss 100a of the second clutch outer member 100.

Figure 7:
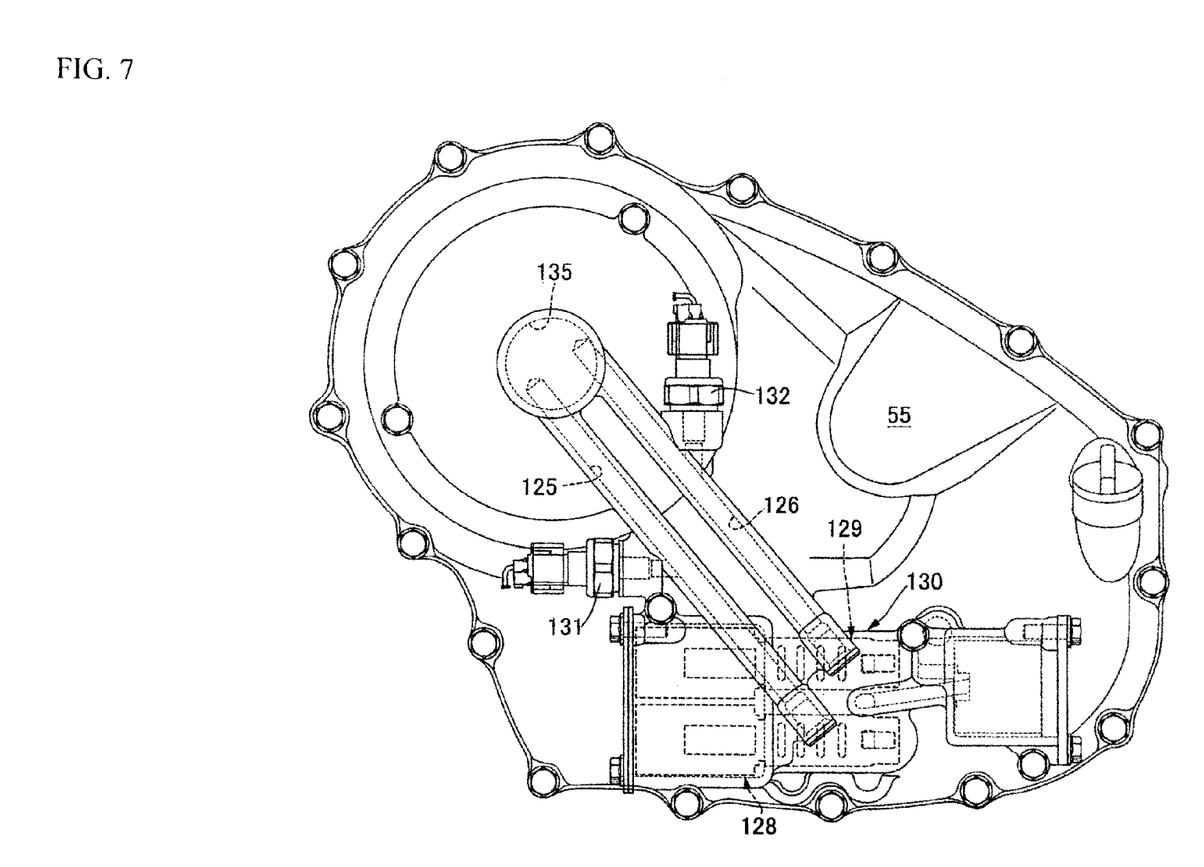
FIG. 7 is a view taken in the direction of arrow 7 in FIG. 4.

As also shown in the example of FIG. 7, control oil can be introduced from the right case cover 55 into the first and second control oil passages 111, 112. The right case cover 55 has a first supply oil passage 125 connected to the first control oil passage 111 and a second supply oil passage 126 connected to the second control oil passage 112.

As shown in the example of FIG. 2, an oil pump 127 which serves as an oil supply source relatively nonrotatably connected to the second balancer 80 is mounted on the lower case body 34 of the crankcase 19. A hydraulic pressure control unit 130, which includes a unitized assembly of a first hydraulic pressure control valve 128 interposed between the first supply oil passage 125 and the oil pump 127 and a second hydraulic pressure control valve 129 interposed between the second supply oil passage 126 and the oil pump 127, is mounted on a lower portion of the right case cover 55.

According to one embodiment, a first hydraulic pressure sensor 131 for detecting a hydraulic pressure in the first supply oil passage 125, and a second hydraulic pressure sensor 132 for detecting a hydraulic pressure in the second supply oil passage 126 are mounted on the right case cover 55.

A cavity 135 having a closed end wall 135a facing the one end portion of the first shaft 71 and receiving the one end portion of the first shaft 71 therein is defined in an inner surface of the right case cover 55 such that the first and second supply oil passages 125, 126 are open at inner circumferential surfaces of the cavity 135. For keeping the first shaft 71 in a constant circumferential position in the cavity 135, a positioning tooth 136 projecting from the one end of the first shaft 71 engages in a positioning recess 137 defined in a circumferential position in the cavity 135.

One of the first and second control oil passages 111, 112 is referred to as one particular control oil passage (in the present embodiment, for example, the second control oil passage 112 may be the one particular oil passage), and the other as another control oil passage. The first shaft 71 has at least one radial joint hole 138 defined in the one end thereof and extending radially of the first shaft 71. The radial joint hole 138 may have an inner end connected to the first control oil passage 111 which serves the other control oil passage. The radial joint hole 138 is connected to the first supply oil passage 125, which is a corresponding one of the first and second supply oil passages 125, 126, in the cavity 135.

According to an embodiment, a cylindrical tubular member 141 is interposed between the outer circumferential surface of the one end portion of the first shaft 71 and the inner circumferential surface of the cavity 135. The cylindrical tubular member 141 may have first and second oil passage forming recesses 139, 140 defined in outer circumferential surfaces thereof independently of each other and connected individually to the first and second supply oil passages 125, 126. The cylindrical tubular member 141 can be disposed inwardly of the inner circumferential surfaces of the first and second clutch pistons 95, 105 of the respective first and second hydraulic clutches 61, 62 on a projection onto a plane perpendicular to the axis of the first shaft 71. Specifically, if imaginary extensions of the outer circumferential surface of the cylindrical tubular member 141 toward the first and second hydraulic clutches 61, 62 are indicated by chain lines L in FIGS. 4 and 6, then the chain lines L extend inwardly of the inner circumferential surfaces of the first and second clutch pistons 95, 105.

In an embodiment, an oil chamber 142 that is connected to the second control oil passage 112 is defined between the closed end wall 135a of the cavity 135, the end of the first shaft 71, and an end of the cylindrical tubular member 141. The cylindrical tubular member 141 has an axial oil hole 143 defined therein which extends axially thereof and allowing the second oil passage forming recess 140, which is one of the first and second oil passage forming recesses 139, 140, to be connected to the oil chamber 142, and a radial oil hole 144 defined therein which extends radially thereof and allowing the first oil passage forming recess 139, which is the other of the first and second oil passage forming recesses 139, 140, to be connected to the radial joint hole 138. The axial oil hole 143 may be shaped as an oblong hole which is long in the circumferential direction of the cylindrical tubular member 141.

A pair of annular seal members 145, 146 are mounted on the outer circumferential surface of the cylindrical tubular member 141 and held in elastic contact with the inner circumferential surface of the cavity 135 for sealing the opposite sides of the region where the first and second oil passage forming recesses 139, 140 and the first and second supply oil passages 125, 126 are connected to each other.

Advantages of certain embodiments will be described below. The first and second hydraulic clutches 61, 62 are mounted on the first shaft 71 which serves as part of the main shaft 58 and which is rotatably supported in the crankcase 19. The first shaft 71 has the first control oil passage 111 defined therein for supplying control oil to the first control hydraulic pressure chamber 96 of the first hydraulic clutch 61, the second control oil passage 112 defined therein for supplying control oil to the second control hydraulic pressure chamber 106 of the second hydraulic clutch 62, and the lubricating oil passage 113 defined therein for supplying lubricating oil to the first and second canceler chambers 97, 107 of the respective first and second hydraulic clutches 61, 62 and lubricated parts around the first shaft 71. The lubricating oil passage 113 includes the upstream oil passage 113a defined coaxially in the first shaft 71 for supplying lubricating oil to lubricated parts around the first shaft 71, and the downstream oil passage 113b connected to the upstream oil passage 113a for supplying lubricating oil from the upstream oil passage 113a to the first and second canceler chambers 97, 107, the downstream oil passage 113b being smaller in diameter than the upstream oil passage 113a. Therefore, a portion of the lubricating oil passage 113 which supplies lubricating oil to the lubricated parts can be increased in diameter for supplying a sufficient amount of lubricating oil to the lubricated parts.

The downstream oil passage 113b connected to the upstream oil passage 113a extends parallel to the axis of the first shaft 71, and at least a portion of the first and second control oil passages 111, 112 which have axes parallel to the downstream oil passage 113b is disposed in a range wherein the downstream oil passage 113b is provided in the direction along the axis of the first shaft 71. Therefore, the lubricating oil passage 113 and the first and second control oil passages 111, 112 can be arranged in a compact layout.

The first and second control oil passages 111, 112 which are connected individually to the first and second control hydraulic pressure chambers 96, 106 of the first and second hydraulic clutches 61, 62 that are juxtaposed along the axis of the first shaft 71, and the downstream oil passage 113b are disposed at a position wherein they are partly superposed on the upstream oil passage 113a on a projection onto a plane perpendicular to the axis of the first shaft 71. Therefore, the lubricating oil passage 113 and the first and second control oil passages 111, 112 can be defined in a compact layout in the first shaft 71.

Since the first and second control oil passages 111, 112 and the downstream oil passage 113b are disposed at equal intervals in the circumferential direction of the first shaft 71, the first and second control oil passages 111, 112 and the downstream oil passage 113b can be disposed in a well-balanced fashion in the first shaft 71 while maintaining the rigidity of the first shaft 71 between the first and second control oil passages 111, 112 and the downstream oil passage 113b. As the first control oil passage 111, the second control oil passage 112, and the downstream oil passage 113b are of the same diameter, they can easily be machined in the first shaft 71 for higher machinability.

The downstream oil passage 113b, the first control oil passage 111, and the second control oil passage 112 have respective outer ends P1, P2, P3 along radial directions of the first shaft 71 which are disposed outwardly of the inner circumferential surface of the upstream oil passage 113a. The downstream oil passage 113b, the first control oil passage 111, and the second control oil passage 112 have respective inner ends P4, P5, P6 along radial directions of the first shaft 71 which are disposed outwardly of the central axis C of the upstream oil passage 113a. Therefore, the downstream oil passage 113b, the first control oil passage 111, and the second control oil passage 112 can be arranged in a compact layout without mutual physical interference.

The downstream oil passage 113b which is drilled together with the first and second control oil passages 111, 112 axially into the one end of the first shaft 71 is connected to the upstream oil passage 113a which is drilled axially into the other end of the first shaft 71. Consequently, the first control oil passage 111, the second control oil passage 112, and the downstream oil passage 113b can be drilled more easily than if they are drilled into the opposite ends of the first shaft 71.

The upstream oil passage 113a of the lubricating oil passage 113 extends from the axially other end of the first shaft 71 and has an inner end disposed at a position which is aligned, as viewed in side elevation, with the second hydraulic clutch 62, among the first and second hydraulic clutches 61, 62 that are juxtaposed in a direction along the axis of the first shaft 71, the first hydraulic clutch 61 being disposed closely to the one end of the first shaft 71 along the axis thereof and the second hydraulic clutch 62 being disposed more closely to the other end of the first shaft 71 along the axis thereof than the first hydraulic clutch 61. Therefore, the upstream oil passage 113a can be made longer and can supply lubricating oil more smoothly to the lubricated parts than if the inner end of the upstream oil passage 113a is positioned more closely to the other end of the first shaft 71 than the second hydraulic clutch 62.

The first and second control oil passages 111, 112 are connected individually to the first and second control hydraulic pressure chambers 96, 106 of the first and second hydraulic clutches 61, 62. The engine E which incorporates a twin-clutch mechanism including the first and second hydraulic clutches 61, 62 can thus be made compact along the axis of the first shaft 71.

The first and second control oil passages 111, 112 are supplied with control oil from the first and second supply oil passages 125, 126 that are defined in the right case cover 55 for guiding oil from the oil pump 127. The cavity 135 having the closed end wall 135a facing the one end portion of the first shaft 71 and receiving the one end portion of the first shaft 71 therein is defined in the inner surface of the right case cover 55 such that the first and second supply oil passages 125, 126 are open at inner circumferential surfaces of the cavity 135. Of the first and second control oil passages 111, 112, the second control oil passage 112 is referred to as one control oil passage, and the first control oil passage 111 as another control oil passage. The first shaft 71 has the radial joint hole 138 defined in the one end thereof and extending radially of the first shaft 71, the radial joint hole 138 having an inner end connected to the first control oil passage 111 which serves the other control oil passage. The radial joint hole 138 is connected to the first supply oil passage 125 in the cavity 135.

Accordingly, the engine E can be made more compact along the axis of the first shaft 71 than if a plurality of pipes are disposed between the first shaft 71 and the right case cover 55 for providing the first and second control oil passages 111, 112.

The cylindrical tubular member 141 is interposed between the outer circumferential surface of the one end portion of the first shaft 71 and the inner circumferential surface of the cavity 135. The cylindrical tubular member 141 has the first and second oil passage forming recesses 139, 140 defined in the outer circumferential surfaces thereof independently of each other and connected individually to the first and second supply oil passages 125, 126. The oil chamber 142 that is connected to the second control oil passage 112 is defined between the closed end wall 135a of the cavity 135, the end of the first shaft 71, and the end of the cylindrical tubular member 141. The cylindrical tubular member 141 has the axial oil hole 143 defined therein which extends axially thereof and allowing the second oil passage forming recess 140, which is one of the first and second oil passage forming recesses 139, 140, to be connected to the oil chamber 142, and the radial oil hole 144 defined therein which extends radially thereof and allowing the first oil passage forming recess 139, which is the other of the first and second oil passage forming recesses 139, 140, to be connected to the radial joint hole 138. Therefore, the first and second supply oil passages 125, 126 defined in the right case cover 55 and the first and second control oil passages 111, 112 defined in the first shaft 71 are connected to each other by a structure which can be made compact.

The cylindrical tubular member 141 is disposed inwardly of the inner circumferential surfaces of the first and second clutch pistons 95, 105 of the respective first and second hydraulic clutches 61, 62 on a projection onto a plane perpendicular to the axis of the first shaft 71. Consequently, the right case cover 55 is prevented from being increased in size by the cylindrical tubular member 141.

The axial oil hole 143 defined in the cylindrical tubular member 141 is shaped as an oblong hole which is long in the circumferential direction of the cylindrical tubular member 141. Compared to an axial oil hole 143 which is shaped as a circular hole, the cylindrical tubular member 141 is prevented from being increased in diameter, the axial oil hole 143 is increased in cross-sectional area, and oil flows more smoothly from the second oil passage forming recess 140 which is one of the first and second oil passage forming recesses 139, 140 that are defined in the outer circumferential surface of the cylindrical tubular member 141 to the oil chamber 142.

The pair of annular seal members 145, 146 are mounted on the outer circumferential surface of the cylindrical tubular member 141 seal the opposite sides of the region where the first and second oil passage forming recesses 139, 140 and the first and second supply oil passages 125, 126 are connected to each other. Therefore, oil flowing from the first and second supply oil passages 125, 126 through the cylindrical tubular member 141 into the first and second control oil passages 111, 112 is prevented from leaking.

In one embodiment, the plug 120 is press-fitted into the one end of the first shaft 71 in the cavity 135 to close the axial end of the first control oil passage 111. Therefore, the first control oil passage 111 and the oil chamber 142 are simply blocked from each other.

According to an embodiment of the present invention, a plurality of oil passages are axially defined in a rotational shaft having an end portion inserted in a cavity defined in a case cover, and one of the oil passages in the rotational shaft is connected to a supply oil passage in the case cover in the cavity through a radial joint hole which is defined in the end portion of the rotational shaft and which extends axially of the rotational shaft. Therefore, the engine can be made more compact along the axis of the rotational shaft than if a plurality of pipes are disposed between the rotational shaft and the case cover for providing the oil passages in the rotational shaft.

According to another embodiment, a cylindrical tubular member is interposed between an outer circumferential surface of the end portion of the rotational shaft and an inner circumferential surface of the cavity, the cylindrical tubular member having a plurality of oil passage forming recesses defined in outer circumferential surfaces thereof and connected individually to a plurality of supply oil passages, an oil chamber that is defined between the closed end wall of the cavity, the end of the rotational shaft, an end of the tubular member is connected to the particular oil passage in the rotational shaft and is also connected to one of the oil passage forming recesses through an axial oil hole defined in the tubular member, and the remaining oil passage forming recess and the radial joint hole are connected to each other by a radial oil hole which extends axially of the tubular member. Therefore, the supply oil passages defined in the case cover and the oil passages defined in the rotational shaft are connected to each other by a structure which can be made compact.

According to another embodiment, first and second hydraulic clutches are mounted on the rotational shaft, and the oil passages which are paired in the rotational shaft are connected individually to respective control hydraulic pressure chambers of the first and second hydraulic clutches. Therefore, the engine which incorporates a twin-clutch mechanism including the first and second hydraulic clutches can be made compact along the axis of the rotational shaft.

According to another embodiment, the oil passages in the rotational shaft are disposed at intervals circumferentially around a central axis of the rotational shaft. Therefore, the oil passages in the rotational shaft can be arranged in a compact layout without mutual physical interference.

According to another embodiment, the tubular member is disposed inwardly of an inner circumferential surface of a clutch piston of the hydraulic clutch on a projection onto a plane perpendicular to the axis of the rotational shaft. Consequently, the case cover is prevented from being increased in size by providing the tubular member.

According to another embodiment, the axial oil hole is shaped as an oblong hole which is long in a circumferential direction of the tubular member. Therefore, compared to an axial oil hole which is shaped as a circular hole, the tubular member is prevented from being increased in diameter, the axial oil hole is increased in cross-sectional area, and oil flows more smoothly from one of the oil passage forming recesses that are defined in the outer circumferential surface of the tubular member into the oil chamber.

According to another embodiment, a pair of annular seal members are mounted on an outer circumferential surface of the tubular member to seal the opposite sides of a region where the oil passage forming recesses and the supply oil passages are connected to each other, thereby preventing a leakage of oil flowing from the supply oil passages through the tubular member into the oil passages in the rotational shaft.

According to another embodiment, a plug is press-fitted in the end portion of the rotational shaft to close an axial end of the other oil passage than the particular oil passage. Therefore, the other oil passage in the rotational shaft and the oil chamber are simply blocked from each other.

While embodiments of the present invention have been described above, the present invention is not limited to the above embodiment, but various changes in design can be made thereto without departing from the scope of the claims.

DESCRIPTION OF REFERENCE SYMBOLS

19 . . . Crankcase
28 . . . Crankshaft
55 . . . Right case cover as case cover
61 . . . First hydraulic clutch
62 . . . Second hydraulic clutch
71 . . . First shaft as rotational shaft
95, 105 . . . Clutch piston
96, 106 . . . Control hydraulic pressure chamber
111 . . . First control oil passage as oil control passage
112 . . . Second control oil passage as oil control passage
120 . . . Plug
125, 126 . . . Supply oil passage
127 . . . Oil pump as oil supply source
135 . . . Cavity
135a . . . Closed end wall
138 . . . Radial joint hole
139, 140 . . . Oil passage forming recess
142 . . . Oil chamber
143 . . . Axial oil hole
144 . . . Radial oil hole
145, 146 . . . Seal member
E . . . Engine

We claim:

1. An oil passage structure for a hydraulic clutch for an engine, the hydraulic clutch being mounted on a rotational shaft having an axis parallel to a crankshaft and rotatably supported in a crankcase, the oil passage structure comprising:
a plurality of oil passages defined in the rotational shaft and extending axially thereof, the oil passages configured to supply oil to a hydraulic clutch; and
a plurality of supply oil passages configured to guide oil from an oil supply source, the supply oil passages being defined in a case cover configured to cover the hydraulic clutch and coupled to the crankcase, the supply oil passages being connected individually to the oil passages in the rotational shaft, wherein a cavity having a closed end wall facing an end of the rotational shaft and receiving the end of the rotational shaft therein is defined in an inner surface of the case cover such that the supply oil passages are open at inner circumferential surfaces of said cavity, wherein at least one radial joint hole is defined in an end portion of said rotational shaft and extends radially of said rotational shaft, the radial joint hole having an inner end connected to one of the oil passages in the rotational shaft, wherein said radial joint hole is connected to a corresponding one of the supply oil passages in said cavity, and wherein the oil passage structure further comprises a cylindrical tubular member entirely interposed between and connected to an outer circumferential surface of the end portion of said rotational shaft and an inner circumferential surface of said cavity.

2. An oil passage structure for a hydraulic clutch for an engine, the hydraulic clutch being mounted on a rotational shaft having an axis parallel to a crankshaft and rotatably supported in a crankcase, the oil passage structure comprising:

a plurality of oil passages defined in the rotational shaft and extending axially thereof, the oil passages configured to supply oil to a hydraulic clutch; and a plurality of supply oil passages configured to guide oil from an oil supply source, the supply oil passages being defined in a case cover configured to cover the hydraulic clutch and coupled to the crankcase, the supply oil passages being connected individually to the oil passages in the rotational shaft, wherein a cavity having a closed end wall facing an end of the rotational shaft and receiving the end of the rotational shaft therein is defined in an inner surface of the case cover such that the supply oil passages are open at inner circumferential surfaces of said cavity, wherein at least one radial joint hole is defined in an end portion of said rotational shaft and extends radially of said rotational shaft, the radial joint hole having an inner end connected to one of the oil passages in the rotational shaft, wherein said radial joint hole is connected to a corresponding one of the supply oil passages in said cavity, wherein the oil passage structure further comprises a cylindrical tubular member interposed between and connected to an outer circumferential surface of the end portion of said rotational shaft and an inner circumferential surface of said cavity, wherein said cylindrical tubular member having oil passage forming recesses defined in outer circumferential surfaces thereof independently of each other and connected individually to said supply oil passages, wherein an oil chamber that is connected to one of the plurality of oil passages is defined by said closed end wall of said cavity, the end of said rotational shaft, and an end of said tubular member, and wherein said tubular member has an axial oil hole defined therein which extends axially thereof and allowing one of the oil passage forming recesses to be connected to said oil chamber, and a radial oil hole defined therein which extends radially thereof and allowing the other oil passage forming recess to be connected to said radial joint hole.

3. The oil passage structure according to claim 1, further comprising first and second hydraulic clutches juxtaposed along the axis of said rotational shaft and are mounted on said rotational shaft, wherein said oil passages which are paired in said rotational shaft are connected individually to respective control hydraulic pressure chambers of said first and second hydraulic clutches.

4. The oil passage structure according to claim 1, wherein said oil passages in said rotational shaft are disposed at intervals circumferentially around a central axis of said rotational shaft.

5. The oil passage structure according to claim 2, wherein said tubular member is disposed inwardly of an inner circumferential surface of a clutch piston of said hydraulic clutch on a projection onto a plane perpendicular to the axis of said rotational shaft.

6. The oil passage structure according to claim 2, wherein said axial oil hole is shaped as an oblong hole which is long in a circumferential direction of said tubular member.

7. The oil passage structure according to claim 2, further comprising a pair of annular seal members mounted on an outer circumferential surface of said tubular member and held in elastic contact with an inner circumferential surface of said cavity, the annular seal members configured to seal the opposite sides of a region where said oil passage forming recesses and said supply oil passages are connected to each other.

8. The oil passage structure according to claim 2, further comprising a plug configured to close an axial end of the one of the oil passages, wherein the plug is press-fitted in the end portion of said rotational shaft.

9. An oil passage structure for a hydraulic clutch for an engine, the hydraulic clutch being mounted on a rotational shaft having an axis parallel to a crankshaft and rotatably supported in a crankcase, the oil passage structure, comprising:

supplying means for supplying oil to a hydraulic clutch, the supplying means defined in the rotational shaft and extending axially thereof; and guiding means for guiding oil from an oil supply source, the guiding means being defined in a case cover means for covering the hydraulic clutch and coupled to the crankcase, the guiding means being connected individually to the supplying means in the rotational shaft;

receiving means for receiving an end of the rotational shaft, the receiving means having a closed end wall facing an end of the rotational shaft, wherein the receiving means is defined in an inner surface of the case cover means such that the guiding means are open at inner circumferential surfaces of the receiving means, wherein at least one radial joint hole is defined in an end portion of said rotational shaft and extends radially of said rotational shaft, the radial joint hole having an inner end connected to one of the supplying means in the rotational shaft, wherein said radial joint hole is connected to a corresponding one of the guiding means in said receiving means, and wherein the oil passage structure further comprises cylindrical tubular member means entirely interposed between and connected to an outer circumferential surface of the end portion of said rotational shaft and an inner circumferential surface of said receiving means.

10. The oil passage structure according to claim 9, further comprising first and second hydraulic clutches juxtaposed along the axis of said rotational shaft and mounted on said rotational shaft, and connecting means for individually connecting said supplying means which are paired in said rotational shaft to respective control hydraulic pressure chambers of said first and second hydraulic clutches.

11. The oil passage structure according to claim 9, wherein said supplying means in said rotational shaft are disposed at intervals circumferentially around a central axis of said rotational shaft.

12. An oil passage structure for a hydraulic clutch for an engine, the hydraulic clutch being mounted on a rotational shaft having an axis parallel to a crankshaft and rotatably supported in a crankcase, the oil passage structure, comprising:
supplying means for supplying oil to a hydraulic clutch, the supplying means defined in the rotational shaft and extending axially thereof; and
guiding means for guiding oil from an oil supply source, the guiding means being defined in a case cover means for covering the hydraulic clutch and coupled to the crankcase, the guiding means being connected individually to the supplying means in the rotational shaft;
receiving means for receiving an end of the rotational shaft, the receiving means having a closed end wall facing an end of the rotational shaft, wherein the receiving means is defined in an inner surface of the case cover means such that the guiding means are open at inner circumferential surfaces of the receiving means,
wherein at least one radial joint hole is defined in an end portion of said rotational shaft and extends radially of said rotational shaft, the radial joint hole having an inner end connected to one of the supplying means in the rotational shaft,
wherein said radial joint hole is connected to a corresponding one of the guiding means in said receiving means,
wherein the oil passage structure further comprises cylindrical tubular member means interposed between and connected to an outer circumferential surface of the end portion of said rotational shaft and an inner circumferential surface of said receiving means,
wherein cylindrical tubular member means having oil passage forming recesses defined in outer circumferential surfaces thereof independently of each other and connected individually to said guiding means,
wherein an oil chamber that is connected to one of the supplying means is defined by said closed end wall of said receiving means, the end of said rotational shaft, and an end of said tubular member means, and
wherein said tubular member means has an axial oil hole defined therein which extends axially thereof and allowing one of the supplying means forming recesses to be connected to said oil chamber, and a radial oil hole defined therein which extends radially thereof and allowing the other supplying means forming recess to be connected to said radial joint hole.

13. The oil passage structure according to claim 12, wherein said tubular member means is disposed inwardly of an inner circumferential surface of a clutch piston of said hydraulic clutch on a projection onto a plane perpendicular to the axis of said rotational shaft.

14. The oil passage structure according to claim 12, wherein said axial oil hole is shaped as an oblong hole which is long in a circumferential direction of said tubular member means.

15. The oil passage structure according to claim 12, further comprising a sealing means, mounted on an outer circumferential surface of said tubular member and held in elastic contact with an inner circumferential surface of said cavity, the annular seal members, for sealing the opposite sides of a region where said supplying means forming recesses and said guiding means are connected to each other.

16. The oil passage structure according to claim 12, further comprising closing means for closing an axial end of the one of the supplying means, wherein the closing means is press-fitted in the end portion of said rotational shaft.

17. A method, comprising:
supplying oil, by a plurality of oil passages, to a hydraulic clutch, the oil passages defined in a rotational shaft having an axis parallel to a crankshaft and rotatably supported in a crankcase, the oil passages extending axially of the rotational shaft;
guiding oil, by a plurality of supply oil passages, from an oil supply source, the supply oil passages being defined in a case cover for covering the hydraulic clutch and coupled to the crankcase;
connecting the supply oil passages individually to the oil passages in the rotational shaft;
receiving, by a cavity, an end of the rotational shaft, the cavity having a closed end wall facing an end of the rotational shaft, and defining the cavity in an inner surface of the case cover such that the supply oil passages are open at inner circumferential surfaces of the cavity;
defining at least one radial joint hole in an end portion of said rotational shaft, extending the at least one radial joint hole radially of said rotational shaft, and connecting an inner end of the radial joint hole to one of the oil passages in the rotational shaft;
connecting said radial joint hole to a corresponding one of the supply oil passages in the cavity; and
interposing entirely between and connecting a cylindrical tubular member to an outer circumferential surface of the end portion of said rotational shaft and an inner circumferential surface of said cavity.

18. The method according to claim 17, further comprising:
mounting first and second hydraulic clutches, which are juxtaposed along the axis of said rotational shaft, on said rotational shaft, and
individually connecting said oil passages which are paired in said rotational shaft to respective control hydraulic pressure chambers of said first and second hydraulic clutches.

19. The method according to claim 17, further comprising disposing the oil passages in said rotational shaft at intervals circumferentially around a central axis of said rotational shaft.

* * * * *